(12) United States Patent
Matousek et al.

(10) Patent No.: US 7,670,219 B2
(45) Date of Patent: Mar. 2, 2010

(54) INTEGRATED AXLE AND CLEANING FAN WRAPPER FOR AN AGRICULTURAL HARVESTING MACHINE

(75) Inventors: Robert A. Matousek, Milan, IL (US); Kai Zhao, Willowbrook, IL (US); William L. Cooksey, Geneseo, IL (US); Jishan Jin, Naperville, IL (US)

(73) Assignee: CNH America LLC, New Holland, PA (US)

( * ) Notice: Subject to any disclaimer, the term of this patent is extended or adjusted under 35 U.S.C. 154(b) by 554 days.

(21) Appl. No.: 11/638,026

(22) Filed: Dec. 13, 2006

(65) Prior Publication Data

US 2008/0146299 A1    Jun. 19, 2008

(51) Int. Cl.
*B08B 5/00* (2006.01)
*A01F 12/48* (2006.01)
*B07B 1/50* (2006.01)

(52) U.S. Cl. .................................................. 460/100
(58) Field of Classification Search ................. 460/100, 460/97, 98, 104, 103
See application file for complete search history.

(56) References Cited

U.S. PATENT DOCUMENTS

| 876,681 | A |   | 1/1908 | Batke et al. |   |
|---|---|---|---|---|---|
| 1,625,365 | A |   | 4/1927 | Inghram |   |
| 2,496,022 | A |   | 1/1950 | Remonte | 172/36 |
| 2,612,742 | A | * | 10/1952 | Heth | 56/124 |
| 3,469,773 | A | * | 9/1969 | Everett et al. | 415/185 |
| 3,664,349 | A | * | 5/1972 | Quick | 460/99 |
| 4,051,856 | A | * | 10/1977 | Reed et al. | 460/98 |
| 4,303,079 | A | * | 12/1981 | Claas et al. | 460/99 |
| 4,353,376 | A | * | 10/1982 | Schuler | 460/67 |
| 4,846,198 | A |   | 7/1989 | Carnewal et al. | 460/21 |
| 4,863,415 | A | * | 9/1989 | Carnewal et al. | 460/101 |
| 4,906,219 | A | * | 3/1990 | Matousek et al. | 460/98 |
| 5,387,154 | A | * | 2/1995 | Peters | 460/99 |
| 5,599,162 | A | * | 2/1997 | Ricketts et al. | 415/53.1 |
| 5,823,569 | A |   | 10/1998 | Scott | 280/781 |
| 5,895,319 | A |   | 4/1999 | Matousek et al. | 460/100 |
| 6,442,916 | B1 |   | 9/2002 | Pope | 56/10.2 R |
| 6,773,343 | B2 |   | 8/2004 | Grywacheski et al. | 460/99 |
| 6,921,330 | B2 | * | 7/2005 | Grywacheski et al. | 460/100 |
| 2004/0023704 | A1 | * | 2/2004 | Grywacheski et al. | 460/99 |
| 2004/0222135 | A1 |   | 11/2004 | Olsen et al. | 209/408 |
| 2004/0224736 | A1 | * | 11/2004 | Grywacheski et al. | 460/101 |

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

An integrated axle and fan wrapper for an agricultural harvesting machine, including a fan wrapper structure connected between first and second spaced apart side sheets and extending sidewardly therebetween in spanning relation to the space, the wrapper structure incorporating at least one cross member connected between the first and second side sheets for holding the side sheets in the parallel spaced relation, and the fan wrapper structure defining and at least partially enclosing an internal cavity configured for receiving a fan for rotation therein. The integrated axle and fan wrapper includes a first axle structure mounted sidewardly outwardly of and integrated with the fan wrapper structure and having a first outer end portion configured for mounting a first wheel thereon, and a second axle structure mounted outwardly of the fan wrapper structure and integrated therewith and having a second outer end portion configured for mounting a second wheel thereon, the fan wrapper structure serving to support and stiffen, strengthen and integrate the axle structures.

26 Claims, 7 Drawing Sheets

INTEGRATED AXLE AND CLEANING FAN WRAPPER FOR AN AGRICULTURAL HARVESTING MACHINE

TECHNICAL FIELD

This invention relates generally to an axle and a cleaning fan of an agricultural harvesting machine, and more particularly, to an integrated structure which provides both an axle and a wrapper for a cleaning fan, particularly adapted for an agricultural combine.

BACKGROUND ART

Agricultural harvesting machines, and particularly, large machines such as combines, commonly utilize an elongate axle or cross member extending sidewardly through or beneath a frame or chassis of the machine, on the opposite ends of which axle or cross member wheels are mounted for supporting the machine. In a combine, the forward wheels are commonly the primary drive wheels, and support the bulk of the weight of the machine, including a grain tank disposed thereabove which can be quite heavy when loaded with grain, as well as a header mounted on the front end of the machine, which can also be quite large, necessitating a particularly large and robust axle or cross member extending across the machine.

Many agricultural operators presently desire combines that have greater harvesting and grain processing and handling capacity. However, this presents a substantial design challenge, as the overall size envelope into which a combine must fit is limited by width restrictions for passage over public roads, thoroughfares, bridges and the like, by height restrictions for passage under overhead wires and through doors of storage and service buildings, and trailer transport restrictions. A necessary component of the grain processing and handling apparatus of a combine is a cleaning fan used to generate a rearwardly directed flow of air to sieves of a cleaning system for removing material other than grain from the grain itself before it is conveyed to the grain tank or offloaded. The cleaning fan is typically enclosed or housed in a wrapper disposed between the sides of the frame or chassis, near the front axle or cross member. Increasing axle weight bearing capacity, particularly by increasing the vertical extent thereof, and, at the same time, increasing grain processing and handling capability, particularly cleaning fan output, can result in competing demands on limited interior space.

As another challenge, as the harvesting and grain processing and handling capacity of a combine are increased, there can be a tendency for complexity, e.g. the number of components, weight and cost to also increase, which can be a disadvantage costwise.

Thus, what is sought is axle and cleaning fan constructions for an agricultural harvesting machine which meets at least one of the challenges and overcomes one of the problems and disadvantages discussed above.

SUMMARY OF THE INVENTION

What is disclosed is an integrated axle and cleaning fan wrapper for an agricultural harvesting machine which meets at least one challenge and overcomes one of the problems and disadvantages discussed above.

According to one preferred aspect of the invention, the fan wrapper structure is connected between, or incorporates, first and second spaced apart side sheets of a frame of the machine. The fan wrapper structure defines and at least partially encloses an internal cavity configured for receiving and containing a cleaning fan for rotation therein, preferably an elongate, sidewardly extending centrifugal fan rotatable about a sidewardly extending rotational axis, which can be, for instance, a fan of conventional, well known construction. The wrapper structure defines an air inlet opening for flow of air to the fan, and an air outlet opening shaped to direct a flow of air generated by the fan to a cleaning system of the machine. The wrapper structure includes or incorporates at least one cross member connected between the first and second side sheets for rigidly supporting and holding the axle structures of the invention in a predetermined spaced apart and aligned relation. The integrated structure includes two axle structures, a first axle structure extending outwardly from one side of the fan wrapper structure and having a first outer end portion configured for mounting a first wheel thereon, and a second axle structure extending sidewardly outwardly from the opposite side of the fan wrapper structure and having a second outer end portion configured for mounting a second wheel thereon. As a result, the fan wrapper essentially serves the dual task of enclosing the cleaning fan and serving as a structural member disposed between the outer axle structures that replaces a conventional, continuous solid axle structure extending through the space between the side sheets or below the side sheets. The integrated fan wrapper and axle provide a stiff and strong combined structure that is more compact than using a separate fan wrapper and axle, and can be advantageously configured, including for good axle strength, air flow, simplicity and cost.

According to another aspect of the invention, the outer end portions of the axle structures support drive units which can include motors for driving the wheels attached thereto, which motors can be, but are not limited to, fluid motors. Mounting elements such as flanges can be incorporated onto the axle outer end portions for this purpose.

DETAILED DESCRIPTION OF THE PREFERRED EMBODIMENTS

Figure 1:
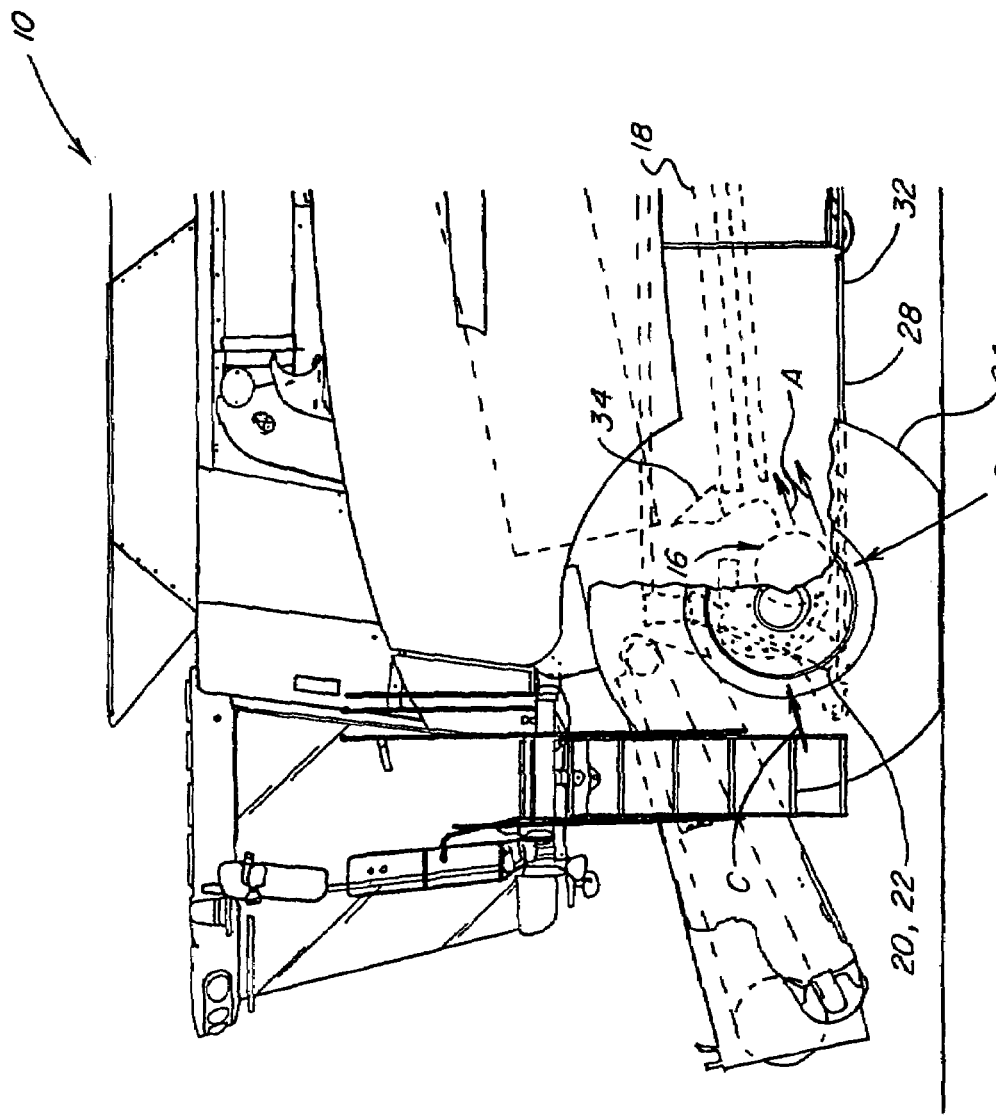
FIG. 1 is a simplified side elevational view of the front end of an agricultural combine, showing generally the location of an integrated axle and cleaning fan wrapper structure according to the present invention.
Figure 2:
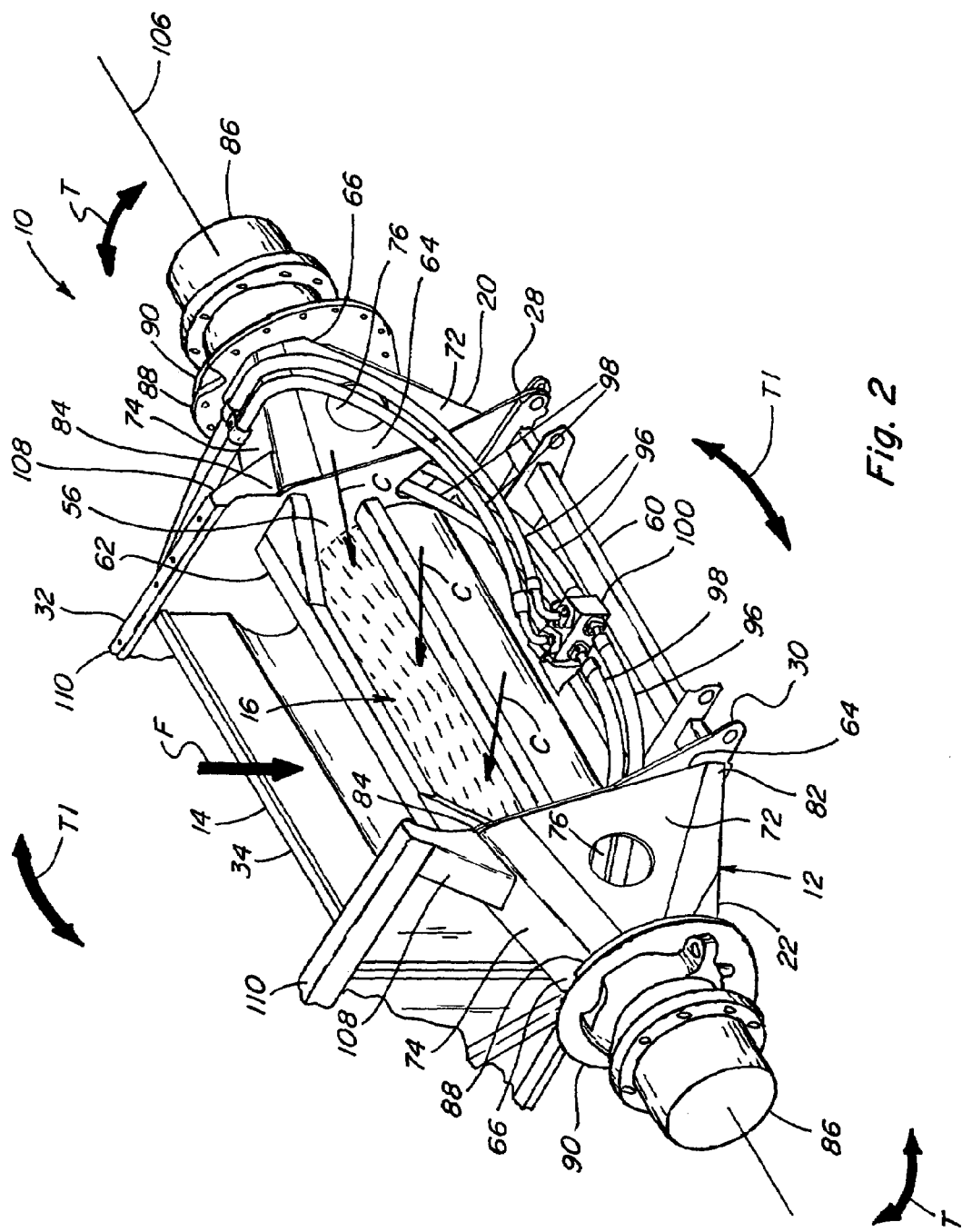
FIG. 2 is a fragmentary perspective view of the integrated axle and cleaning fan wrapper structure according to the invention, illustrating wheel drive units in connection with axle structures of the invention.

Referring now to the drawings, in FIGS. 1 and 2, an agricultural combine 10 is shown including an integrated axle and cleaning fan wrapper 12 constructed and operable according to the teachings of the present invention. Integrated axle and cleaning fan wrapper 12 includes a fan wrapper structure 14 enclosing and containing a cleaning fan 16 operable for blowing a flow of air upwardly and rearwardly, as denoted by arrows A in FIG. 1, through sieves of a cleaning system 18 of combine 10 operable in the well-known manner for separating material other than grain from grain harvested by combine 10. Integrated axle and cleaning fan wrapper 12 additionally includes a first axle structure 20, and a second axle structure 22, on opposite sides of combine 10 for connection of drive wheels thereto, as represented by drive wheel 24 in FIG. 1. The forward and mid portions of combine 10 are illustrated in FIG. 1, and it is contemplated that the integrated axle and cleaning fan wrapper 12 of the invention is preferably configured for use in connection with forwardly located drive wheels of a combine, although the present invention is not intended to be limited by that application.

Figure 3:
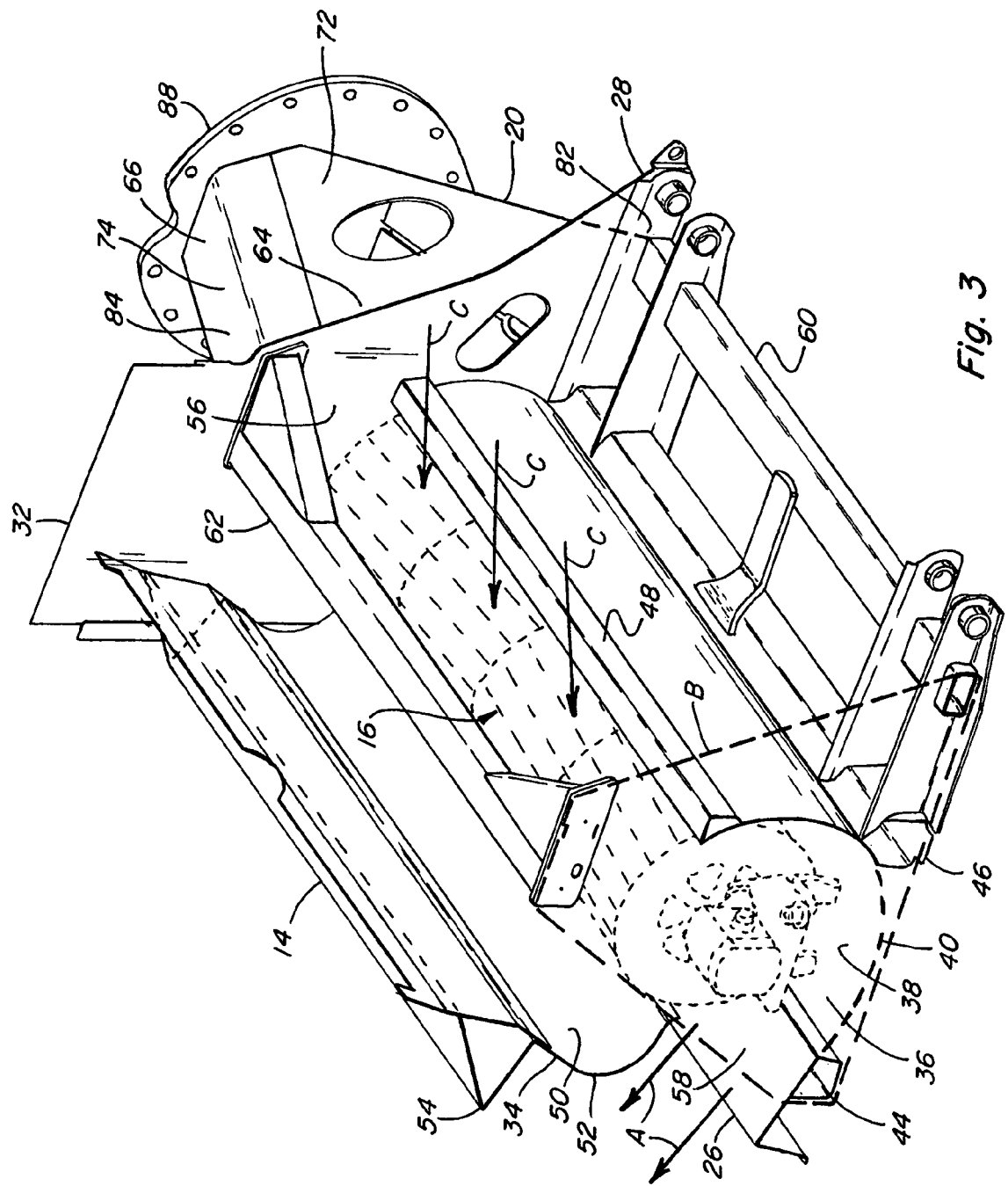
FIG. 3 is an enlarged fragmentary perspective view of the structure of the invention, with a side sheet and axle thereof removed to reveal a representative cleaning fan installed therein and shown in hidden lines.
Figure 4:
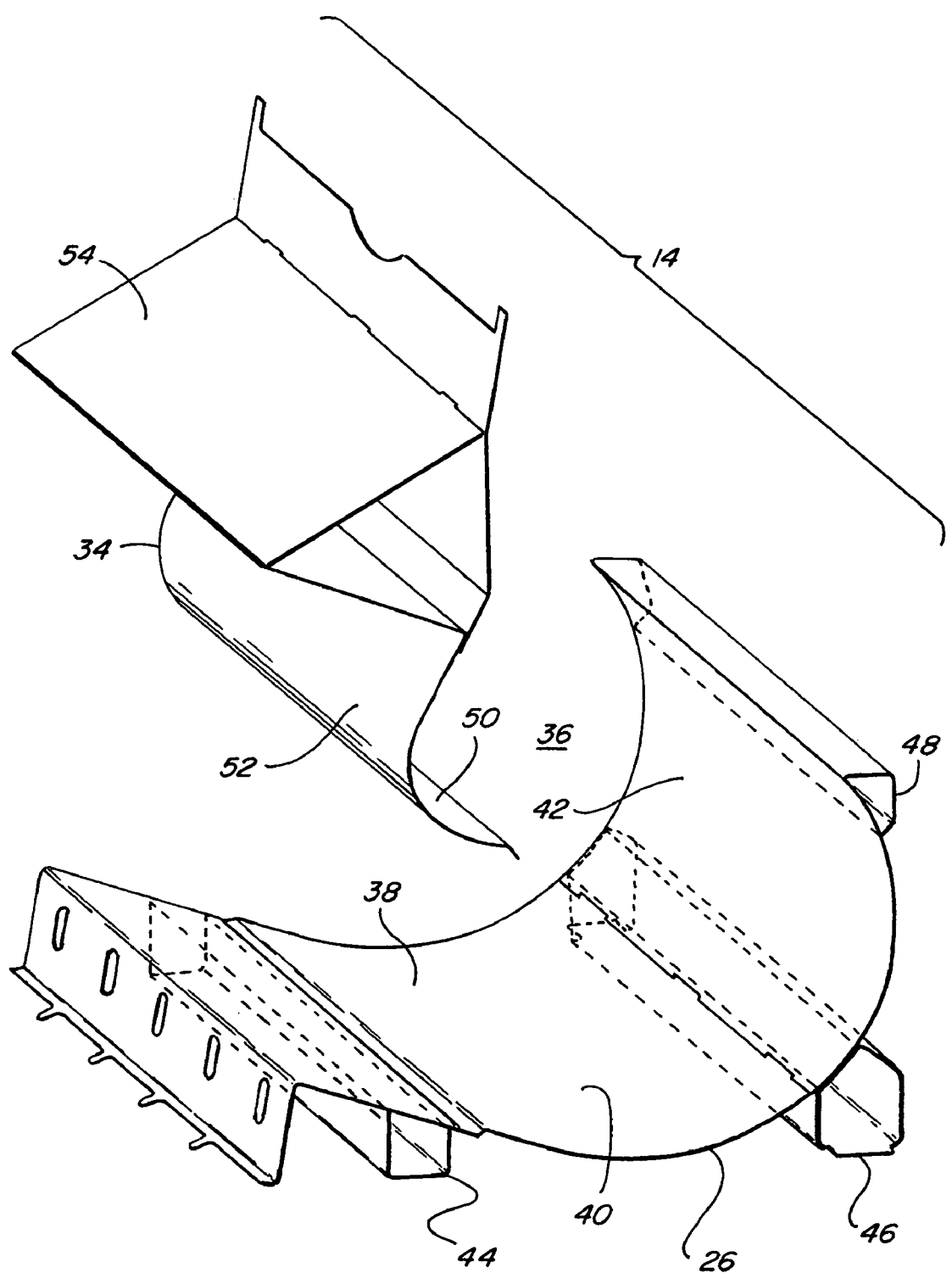
FIG. 4 is a perspective view of aspects of a fan wrapper structure of the invention.

Referring also to FIGS. 3 and 4, fan wrapper structure 14 includes a lower wrapper portion 26, preferably of sheet metal construction, which extends sidewardly or laterally between lower regions of a first side sheet 28 and a generally parallel, second side sheet 30 (both side sheets shown in FIG. 2) of a frame 32 of combine 10. Fan wrapper structure 14 includes an upper wrapper portion 34, also preferably of sheet metal construction, which extends sidewardly or laterally between first side sheet 28 and second side sheet 30, in spaced relation to and generally above a portion of lower wrapper portion 26, defining or forming an interior cavity 36 therebetween. Wrapper portions 26 and 34 can be suitably attached to side sheets 28 and 30, such as by welding, fasteners, or the like. Lower wrapper portion 26 includes a surface 38 facing interior cavity 36 and which preferably has a concave shape including a lower portion 40 which defines and encloses a lower periphery of interior cavity 36, and a forward portion 42 which defines and encloses a forward periphery of cavity 36. Cavity 36 is of sufficient sideward and sectional extent so as to accommodate a conventional cleaning fan therein, such as fan 16 which is a centrifugal or cross flow fan of conventional construction and operation commonly used for combine cleaning systems.

Lower wrapper portion 26 additionally includes or incorporates structural cross members 44, 46 and 48 therein, which cross members 44, 46 and 48 extend sidewardly along the wrapper portion 26, preferably outside of interior cavity 36, at predetermined locations between first and second side sheets 28 and 30. Upper wrapper portion 34 includes a concave surface 50 which faces and defines a rearward periphery of interior cavity 38, and an opposite convex surface 52 both of which function as air flow guides, concave surface 50 for directing air flow from wrapper portion 14 to the cleaning system 18 (FIG. 1), and convex surface 52 for directing air flow into interior cavity 38. Upper wrapper portion 34 additionally includes or incorporates a structural cross member 54 which extends sidewardly therealong outside of and above interior cavity 36, between first and second side sheets 28 and 30. Cross member 54 also is positioned beneath the inlet region of a threshing system of the combine, so as to serve as a deflector for deflecting grain onto an upper sieve of the cleaning system. Together, lower wrapper portion 26 and upper wrapper portion 34 define a forwardly facing air inlet opening 56 (FIG. 3), and a rearwardly and upwardly facing air outlet opening 58, both of which can extend the full width or sideward extent of the space between side sheets 28 and 30 as shown. In FIG. 3, lower portion 40 of lower wrapper portion 26 is shown in dotted lines, to illustrate that it is removable, such as for servicing fan 16 or cleaning.

Additionally, lower wrapper portion 26, upper wrapper portion 34, and cross members 44, 46, 48 and 54 are positioned and configured to support first and second side sheets 28 and 30, and to serve as structural members disposed between and in support of first and second axle structures 20 and 22, as will be explained next. Here, it should be noted and understood that it is contemplated that a variety of other structural members, including, but not limited to, additional cross members 60 and 62, will be provided at different locations in connection with side sheets 28 and 30 for stiffening those members, as well as for supporting other components of combine 10, and for further enclosing interior cavity 36, some of which additional structural members complement and function in concert with the components of integrated axle and cleaning fan wrapper 12 of the invention, for providing a robust and strong combine frame or chassis.

Figure 5:
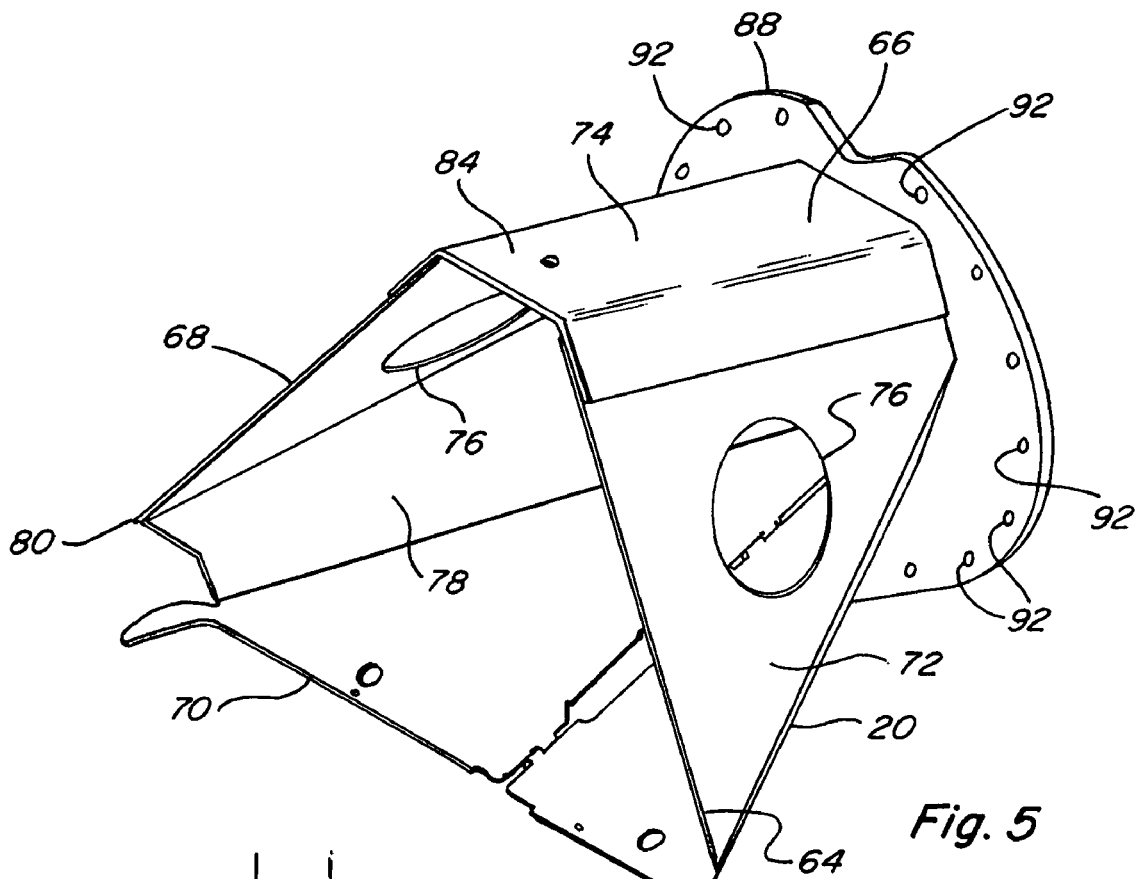
FIG. 5 is a fragmentary perspective view of an axle structure of the invention.
Figure 6:
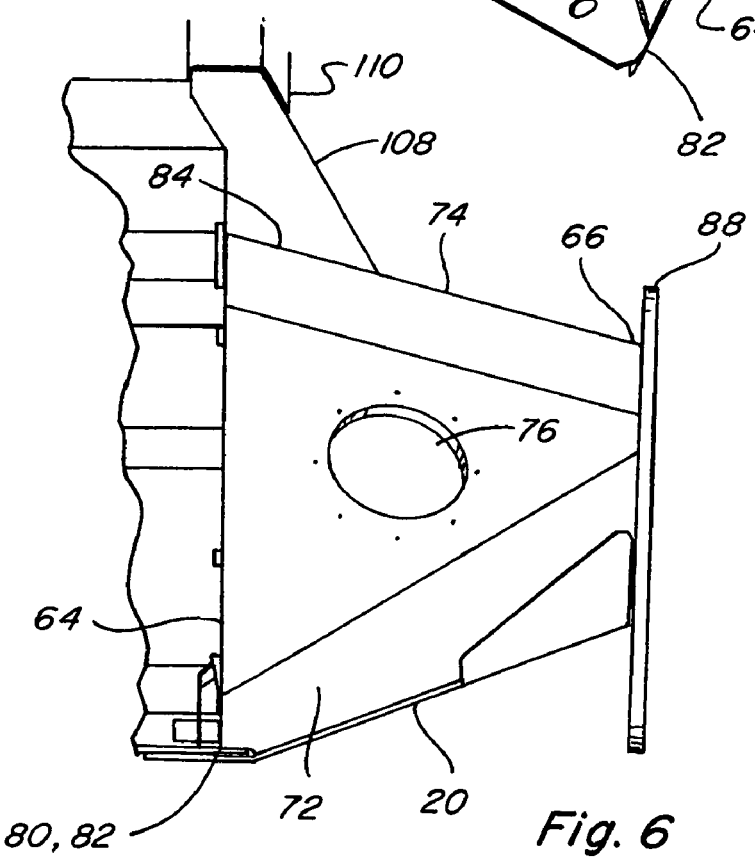
FIG. 6 is a front view of the axle structure of FIG. 5.
Figure 7:
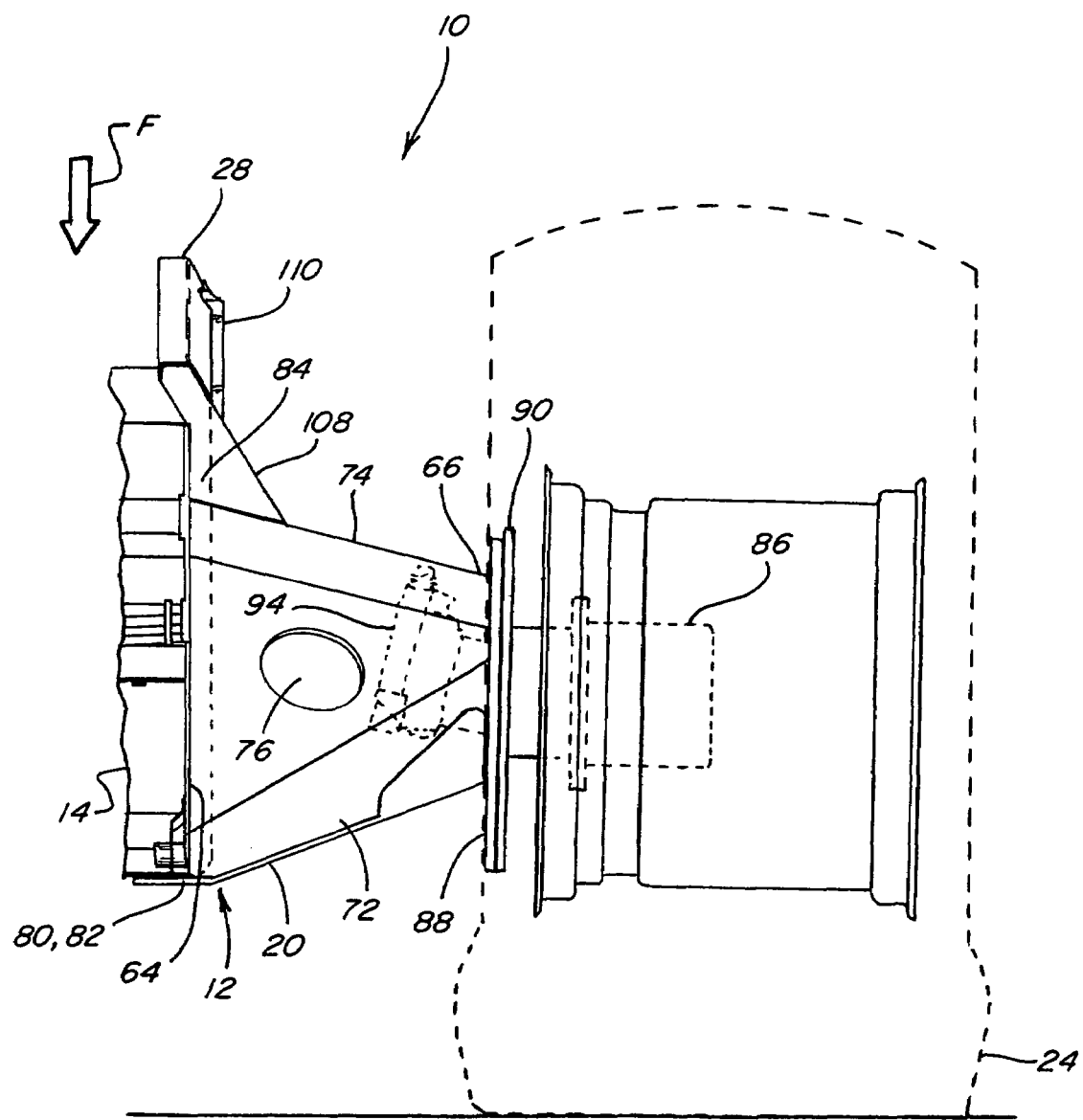
FIG. 7 is a fragmentary front view of the combine of FIG. 1, showing an axle structure of the invention, including a tire connected thereto and a wheel drive unit there shown in dotted lines.

Referring also to FIGS. 5, 6 and 7, as noted above, first and second axle structures 20 and 22 connect with forward drive wheels disposed on opposite sides of combine 10, respectively, as illustrated by drive wheel 24. Axle structures 20 and 22 are essentially mirror images of one another, and each comprises a multiple sided sheet metal three-dimensional structure which extends sidewardly or laterally outwardly from a mounting end portion 64 in connection with the respective side sheet 28 or 30 to an outer end portion 66. Each of axle structures 20 and 22 is preferably hollow, and has a shape which tapers convergingly or narrowingly as it extends sidewardly outwardly from mounting end portion 64 toward the outer end portion 66 thereof.

Referring in particular to FIG. 5, each axle structure 20 and 22 (as represented by axle structure 20) generally includes a rear sheet 68, a bottom sheet 70, a forward sheet 72 and an upper sheet 74. Rear sheet 68 and the rearward portion of bottom sheet 70 are preferably fabricated from a single folded sheet, as are the forward portion of bottom sheet 70 and forward sheet 72, the two sheets being joined at about the center of bottom sheet 70, using a suitable sheet-metal joint and/or by welding. Upper sheet 74 overlays and is connected to the upper regions of sheets 68 and 72, again, utilizing a suitable joint and/or by welding. Referring also to FIG. 6, it can be seen that the sides of axle structure 20 taper convergingly from mounting end portion 64 to outer end portion 66. Suitable access openings 76 in rear sheet 68 and forward sheet 72 provide access to an interior 78.

Referring again to all of the Figures, mounting end portion 64 of each axle structure 20 or 22 is welded and/or otherwise suitably attached such as with fasteners, to the adjacent side sheet 28 or 30 at predetermined locations so as to essentially be aligned in the sideward direction and integrate with certain of the structural elements associated with fan wrapper structure 14, in particular, cross members 44, 46, 48, 60 and 62, so as to form a continuous structure extending between the opposite outer end portions 66 of the axle structures. In this regard, referring more particularly to FIGS. 3 and 5, it can be seen that cross members 44, 46, 60 and 62 define the corners or boundaries of a multiple sided shape, denoted by dotted line B, which shape matches or corresponds closely with the multiple sided shape and size of mounting end portion 64 of first axle structure 20. Second axle structure 22 is a mirror image of first axle structure 20, and thus it can be seen that it will overlay line B when attached to side sheet 30. As a result, when assembled, corners 80, 82 and 84 of first and second axle structures 20 and 22 align in the sideward direction and are connected together by cross members 44, 60 and 62, forming a continuous, sidewardly extending three-dimensional axle framework or structure. This axle framework or structure preferably envelopes or contains lower wrapper portion 26 which incorporates cross member 44 of this structure or framework, and also cross members 46 and 48, thus integrating the axle structures 20 and 22 with fan wrapper structure 14. Lower wrapper portion 26 and upper wrapper portion reinforce and stiffen and strengthen this integrated structure while also enclosing the interior cavity 36.

Addressing air flow, arrows C in FIGS. 1, 2 and 3 illustrate air flow into fan wrapper structure 14 as generated by rotation of cleaning fan 16, while arrows A illustrate air flow from structure 14 (FIGS. 1 and 3) to cleaning system 18 (FIG. 1). Thus, it is apparent that the structure of the invention is strong and robust, yet allows air flow directly therethrough. Addressing propulsion, each axle structure 20 and 22 connects to a drive wheel of combine 10, illustrated by drive wheel 24 in FIGS. 1 and 7. Each drive wheel, in turn, is preferably drivingly rotated by a wheel drive unit 86 connecting the drive wheel to the respective axle structure 20 or 22. Each axle structure 20 and 22 includes a circular mounting flange 88 attached to outer end portion 66 for this purpose. Each wheel drive unit 86 includes a mating flange 90, and flanges 88 and 90 are suitably connected together, for instance, using bolts (not shown) through aligned arrays of bolt holes 92 around the respective flanges. Each wheel drive unit 86 is preferably a fluid powered planetary drive unit, including a fluid motor 94 (FIG. 7) disposed within a hollow cavity of the respective axle structure 20 and 22, and suitably connected to a source of pressurized fluid and a fluid reservoir (both not shown) of combine 10 in the conventional, well-known manner, via fluid lines 96 and 98 and a valve 100 (FIG. 2). Rotation of motor 94 effects rotation of internal components of drive unit 86, to effect rotation of the wheel 24.

Figure 8:
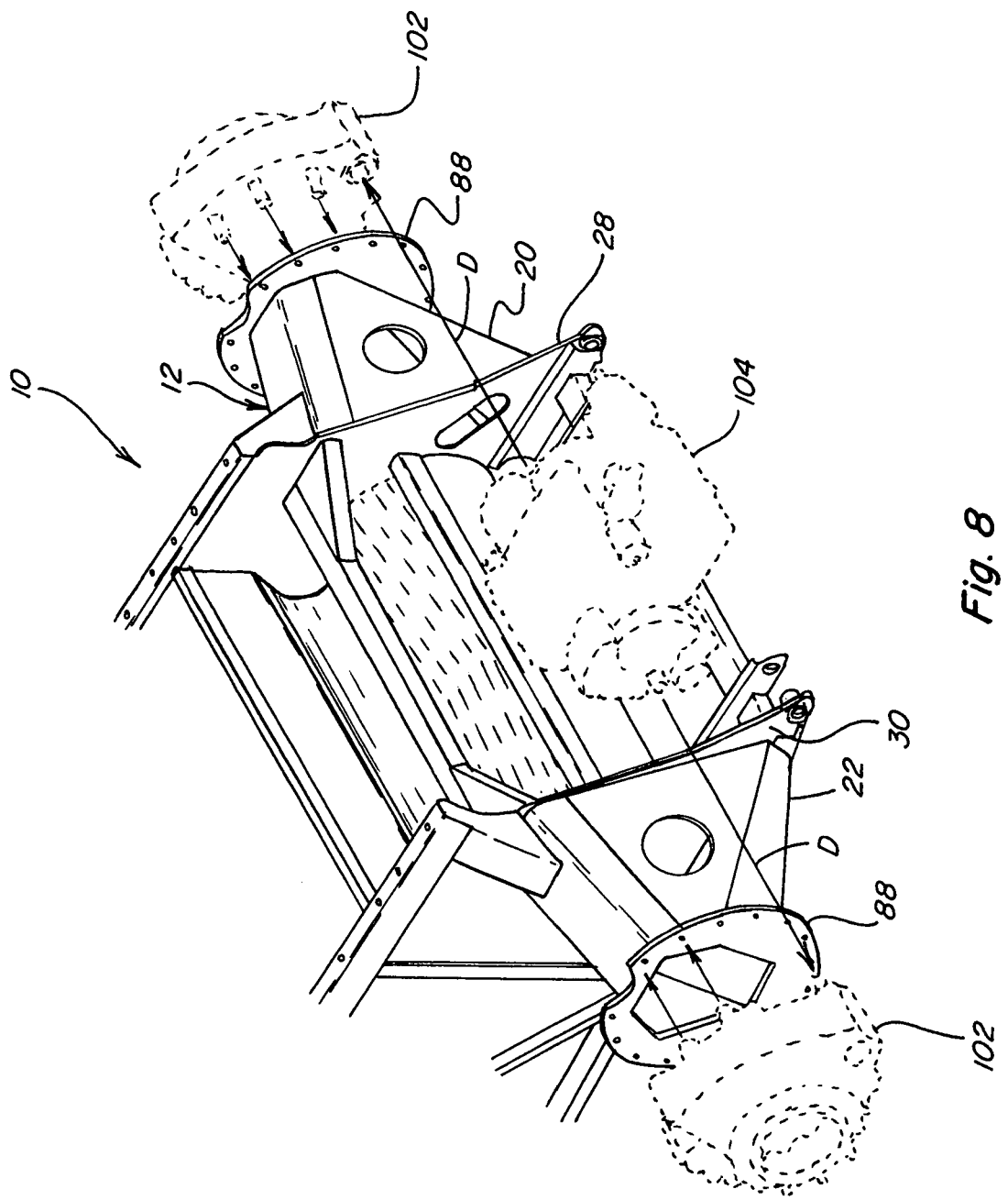
FIG. 8 is a fragmentary perspective view of the forward end of the combine of FIG. 1, illustrating elements of an alternative drive arrangement for the drive wheels thereof.

Referring also to FIG. 8, an alternative drive arrangement for combine 10 is illustrated. Here, planetary wheel drive units 102 of conventional construction and operation are shown installable on mounting flanges 88 of axle structures 20 and 22 of integrated axle and cleaning fan wrapper 12 of the invention. A transmission 104 is illustrated mounted between the forward ends of side sheets 28 and 30. Drive shafts (not shown) are then connectable between transmission 104 and respective drive units 102, as illustrated by arrows D, for transmitting power from a power plant (not shown) of combine 10 to the drive wheels.

Referring more particularly to FIGS. 2 and 8, integrated axle and cleaning fan wrapper 12 of the invention will be subjected to substantial static loading conditions, including, but not limited to, the weight of a significant portion of combine 10, a header (not shown) mounted thereon, and any grain contained in a grain tank thereof, which loads are collectively denoted by arrows F. During operation, substantial dynamic loads, for instance, but not limited to, torque loads denoted by arrows T will be also generated by driving rotation of the drive wheels, and torque loads denoted by arrows T1 will be generated by movement over uneven terrain, hillsides, and the like. Integrated axle and cleaning fan wrapper 12 is designed to maintain wheel drive units 86 in sidewardly aligned relation about a drive axis 106, in opposition to all of the contemplated loading conditions, F, T and T1. To facilitate this, supplemental braces can be used, as required for reinforcement and integration of the structure of the invention with the structure of the combine, to direct and distribute loads to desired portions of integrated axle and cleaning fan wrapper 12. For instance in this regard, braces 108 are illustrated integrating each axle structure 20 and 22 with a top rail 110 of the associated side sheet 28 and 30. The shape and configuration of the various elements of integrated axle and cleaning fan wrapper 12, the gauge of the sheet metal used, and the construction and selection of interlocking seams, welds and the like, for a particular application can be determined, for instance, by analysis, which can include, but is not limited to, finite element analysis.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An integrated axle and cleaning fan wrapper for an agricultural harvesting machine including a cleaning system, comprising:

a hollow fan wrapper structure extending at least partially around and defining an interior cavity configured for receiving a cleaning fan therein, the fan wrapper structure having a first end portion, an opposite second end portion, and plurality of sheet portions extending between the first and second end portions and partially enclosing the interior cavity and defining an air inlet opening in connection with the interior cavity and an air outlet opening in connection therewith and configured for directing a flow of air generated by the cleaning fan to a cleaning system of a harvesting machine;

a first outer axle structure having a mounting end portion in connection with and extending outwardly from the first end portion of the fan wrapper structure and an outer end configured for connecting a wheel thereto, wherein the mounting end portion includes a plurality of members collectively forming a first multiple sided shape;

a second outer axle structure having a mounting end portion in connection with and extending outwardly from the second end portion of the fan wrapper structure and an outer end configured for connecting a wheel thereto, wherein the mounting end portion includes a plurality of members collectively forming a second multiple sided shape, the first and second outer axle structures being disposed in a predetermined aligned relation one to the other; and wherein the fan wrapper structure includes a plurality of cross members extending between the first and second outer axle structures, the plurality of cross members define a boundary of a third multiple sided shape, wherein the first, second and third multiple sided shapes are substantially the same shape, and the plurality of cross members are configured for supporting and holding the first and second outer axle structures in the predetermined aligned relation such that the first, second and third multiple sided shapes are in substantial alignment forming a continuous sidewardly extending structure.

2. The integrated axle and cleaning fan wrapper of claim 1, wherein the sheet portions comprise a lower wrapper portion defining and enclosing a lower periphery of the interior cavity and an upper wrapper portion disposed spaced-above the lower wrapper portion and defining and enclosing an upper portion of the interior cavity, at least one of the wrapper portions incorporating at least one of the cross members therein.

3. The integrated axle and cleaning fan wrapper of claim 2, wherein the lower wrapper portion incorporates at least one of the cross members therein outwardly of the interior cavity.

4. The integrated axle and cleaning fan wrapper of claim 1, wherein the plurality of members of the first and second axle structures comprise sheet metal structures, respectively.

5. The integrated axle and cleaning fan wrapper of claim 4, wherein the fan wrapper structure comprises a lower sheet metal member having an upwardly facing concave shape, and an upper sheet metal member spaced upwardly from the lower sheet metal member, the sheet metal members defining the air inlet opening and the air outlet opening therebetween.

6. The integrated axle and cleaning fan wrapper of claim 5, wherein at least one of the lower and upper sheet metal members includes at least two of the cross members incorporated therein.

7. The integrated axle and cleaning fan wrapper of claim 1, wherein at least one of the end portions of the wrapper structure is enclosed by a side sheet of a frame of the harvesting machine.

8. The integrated axle and cleaning fan wrapper of claim 1, wherein each of the outer axle structures has a tapered shape which extends convergingly toward the outer end thereof.

9. The integrated axle and cleaning fan wrapper of claim 1, wherein at least one of the outer axle structures supports a wheel drive unit thereon configured for rotatably driving a wheel connected thereto.

10. The integrated axle and cleaning fan wrapper of claim 9, wherein the wheel drive unit comprises a planetary gear unit.

11. The integrated axle and cleaning fan wrapper of claim 9, wherein the each of the outer axle structures comprises a hollow structure including a longitudinally endmost mounting plate configured for mounting a wheel drive unit thereto.

12. The integrated axle and cleaning fan wrapper of claim 1, wherein the harvesting machine comprises a combine and the fan wrapper portion extends between side sheets of a frame of the combine.

13. A frame for an agricultural combine, comprising:
a first side sheet;
a second side sheet extending in generally parallel, spaced relation to the first side sheet defining a space therebetween;
a fan wrapper structure connected to the first and second side sheets and extending laterally therebetween in spanning relation to the space therebetween, the fan wrapper structure includes a plurality of lateral cross members connected between the first and second side sheets for rigidly holding the side sheets in the parallel spaced relation, the plurality of cross members define a boundary of a first multiple sided shape, the fan wrapper structure defining and at least partially enclosing an internal cavity configured for receiving a fan for rotation therein for generating a flow of air for a cleaning system of the combine;
a first outer axle structure having a mounting end portion mounted to the first side sheet in predetermined lateral alignment with the fan wrapper structure and extending laterally outwardly therefrom, wherein the mounting end portion includes a plurality of members collectively forming a second multiple sided shape, the first outer axle structure having a first lateral outer end portion including structure configured for connecting a first wheel thereto; and
a second outer axle structure having a mounting end portion mounted to the second side sheet and extending laterally outwardly therefrom in predetermined lateral alignment with the first outer axle structure, wherein the mounting end portion includes a plurality of members collectively forming a third multiple sided shape, the second outer axle structure having a second lateral outer end portion including structure configured for connecting a second wheel thereto, wherein the first, second and third multiple sided shapes are substantially the same shape, and the plurality of cross members of the fan wrapper structure are configured for supporting and holding the first and second outer axle structures in the predetermined lateral relation such that the first, second and third multiple sided shapes are in substantial lateral alignment.

14. The frame of claim 13, comprising a first wheel drive unit mounted on the structure of the first lateral outer end portion and configured for rotatably driving a wheel connected thereto, and a second wheel drive unit mounted on the structure of the second lateral outer end portion and configured for rotatably driving a wheel connected thereto.

15. The frame of claim 14, wherein the first and second wheel drive units comprise motor driven planetary gear arrangements.

16. The frame of claim 13, wherein the fan wrapper structure comprises at least one sheet configured for defining at least one laterally extending air inlet opening in connection with the interior cavity.

17. The frame of claim 16, wherein the at least one sheet defines at least one laterally extending air outlet opening in connection with the interior cavity.

18. The frame of claim 13, wherein the fan wrapper structure includes a lower wrapper portion of sheet metal including at least two of the cross members incorporated therein and extending laterally between the side sheets.

19. The frame of claim 13, wherein the plurality of members of each of the first and second outer axle structures comprises a hollow sheet metal structure having a tapered shape which tapers convergingly outwardly toward the lateral outer end portion thereof.

20. An integrated axle and fan wrapper for an agricultural combine, comprising:
a first side sheet;
an elongate second side sheet extending in at least generally parallel, spaced relation to the first side sheet, defining a space therebetween;
a fan wrapper structure connected to the first and second side sheets and extending sidewardly therebetween in spanning relation to the space therebetween, the fan wrapper structure defining and at least partially enclosing an internal cavity configured for receiving a fan for rotation therein;
a first axle structure having a mounting end portion mounted to the first side sheet sidewardly outwardly of and in predetermined aligned relation with the fan wrapper structure and having a first outer end portion configured for mounting a first wheel thereon, wherein the mounting end portion includes a plurality of members collectively forming a first multiple sided shape:
a second axle structure having a mounting end portion mounted to the second side sheet sidewardly outwardly of and in predetermined aligned relation with the fan wrapper structure and having a second outer end portion configured for mounting a second wheel thereon, wherein the mounting end portion includes a plurality of members collectively forming a second multiple sided shape; and
wherein the fan wrapper structure includes a plurality of cross members extending between the first and second axle structures, the plurality of cross members define a boundary of a third multiple sided shape, wherein the first, second and third multiple sided shapes are substantially the same shape, the plurality of cross members are connected between the first and second side sheets for holding the side sheets in the at least generally parallel spaced relation and the axle structures in the predetermined aligned relation with the fan wrapper structure, such that the first, second and third multiple sided shapes are substantially in the predetermined aligned relation.

21. The integrated axle and fan wrapper of claim 20, comprising a first wheel drive unit mounted on the first outer end portion and configured for rotatably driving a wheel connected thereto, and a second motor mounted on the second outer end portion and configured for rotatably driving a wheel connected thereto.

22. The integrated axle and fan wrapper of claim 21, wherein the first and second wheel drive units comprise fluid motors, respectively.

23. The integrated axle and fan wrapper of claim 20, wherein the fan wrapper structure defines at least one sidewardly extending air inlet opening in connection with the interior cavity.

24. The integrated axle and fan wrapper of claim 20, wherein the fan wrapper structure defines at least one sidewardly extending air outlet opening in connection with the interior cavity.

25. The integrated axle and fan wrapper of claim 20, wherein the fan wrapper structure includes a lower wrapper portion of sheet metal having an upwardly facing concave shape and including at least one cross member extending sidewardly between the side sheets.

26. The frame of claim 20, wherein the plurality of members of each of the first and second axle structures comprises a hollow sheet metal structure having a tapered shape which tapers convergingly outwardly toward the outer end portion thereof.

* * * * *